(12) United States Patent
Zhou et al.

(10) Patent No.: US 12,494,321 B2
(45) Date of Patent: Dec. 9, 2025

(54) ELECTRIC PRESS WITH DISC STACKING

(71) Applicant: Baigida Intelligent Technology (Ningbo) Co., Ltd., Zhejiang (CN)

(72) Inventors: Niansheng Zhou, Zhejiang (CN); Huihe Fang, Zhejiang (CN); Kaixuan Yu, Zhejiang (CN); Wenzhong Zhou, Zhejiang (CN); Xingjie Wang, Zhejiang (CN); Daoyang Liao, Zhejiang (CN); Keqi Zheng, Zhejiang (CN); Xiongpeng Zhu, Zhejiang (CN); Lei Zhang, Zhejiang (CN); Jian Cao, Zhejiang (CN); Jianfeng Xin, Zhejiang (CN); Hao Zhu, Zhejiang (CN); Jianli Zhu, Zhejiang (CN)

(73) Assignee: Baigida Intelligent Technology (Ningbo) Co., Ltd, Zhejiang (CN)

( * ) Notice: Subject to any disclaimer, the term of this patent is extended or adjusted under 35 U.S.C. 154(b) by 220 days.

(21) Appl. No.: 18/536,218

(22) Filed: Dec. 11, 2023

(65) Prior Publication Data

US 2025/0095913 A1     Mar. 20, 2025

(30) Foreign Application Priority Data

Sep. 20, 2023   (CN) .......................... 202311212275.7

(51) Int. Cl.
   *H01F 41/02*     (2006.01)
   *H01F 1/057*     (2006.01)

(52) U.S. Cl.
   CPC ....... *H01F 41/0266* (2013.01); *H01F 1/0576* (2013.01)

(58) Field of Classification Search
   CPC ... H01F 41/0266; H01F 1/0576; B30B 15/32; B65G 61/00; B65G 47/82; B65G 47/901; B65G 57/035; B65G 2201/0258
   (Continued)

(56) References Cited

U.S. PATENT DOCUMENTS 5,094,585 A * 3/1992 Cruver ................... B65G 47/52
                                                   414/794.4
5,119,354 A * 6/1992 Umesaki ................ G11B 17/26
(Continued)

FOREIGN PATENT DOCUMENTS

CN     211661081 U  * 10/2020
CN     107472884 B  *  3/2021 ............. B65G 65/32

*Primary Examiner* — Shawki S Ismail
*Assistant Examiner* — Lisa N Homza

(57) ABSTRACT

An electric press with disc stacking, includes two sets of all-electric presses, a blank disc transporting and stacking all-in-one machine, and a control box. The blank disc transporting and stacking all-in-one machine includes a blank disc feeding mechanism, a cassette conveying mechanism, a product transporting and flipping mechanism, a product disc stacking mechanism, and a pallet feeding mechanism. During operation, the blank disc feeding mechanism feeds blank disc to a blank disc receiving station; the cassette conveying mechanism conveys the blank discs to a product loading station and install products in the blank discs; pallets are transported to the product disc stacking mechanism; the cassette conveying mechanism conveys the pallets with products loaded to a disc stacking station for a disc stacking operation, and after the disc stacking, conveys the products into the pallets for palletization.

6 Claims, 8 Drawing Sheets

(58) Field of Classification Search
USPC .......................................................... 335/302
See application file for complete search history.

(56) References Cited

U.S. PATENT DOCUMENTS

| | | | | |
|---|---|---|---|---|
| 6,091,696 | A | * | 7/2000 | Miyoshi ............... G11B 17/223 |
| 6,106,219 | A | * | 8/2000 | Newsome ........... B65H 31/3081 |
| | | | | 414/790.6 |
| 2001/0005355 | A1 | * | 6/2001 | Nakamura ............. G11B 17/22 |
| | | | | 720/615 |
| 2003/0118430 | A1 | * | 6/2003 | Braaten ................. B65G 67/20 |
| | | | | 414/659 |

\* cited by examiner

ELECTRIC PRESS WITH DISC STACKING

BACKGROUND OF THE INVENTION

1. Technical Field

The present invention relates to the technical field of neodymium iron boron (NdFeB) machining equipment, and in particular to an electric press with disc stacking.

2. Description of Related Art

NdFeB is a magnetic material known as "magneto" due to its excellent magnetic properties. NdFeB can be classified into sintered NdFeB and bonded NdFeB. Due to its magnetism far superior to that of the bonded NdFeB, the sintered NdFeB has been widely applied in fields such as electronics, electrical machinery, medical devices, tools, packaging, hardware machinery, and aerospace. NdFeB is first compressed and molded in a magnetic field, then sintered at high temperature in a vacuum sintering furnace, and subsequently cooled to allow densification. In this way, the sintered product may achieve higher magnetic properties. Therefore, a rack must be disposed in a closed condition throughout the process, and oil stripping and disc stacking operations need to be conducted in the presence of nitrogen so as to prevent oxidation of NdFeB products. However, in the existing process of machining NdFeB products, discs are delivered individually during disc stacking and also individually during delivery, and during final disc stacking, the discs are individually stacked, resulting in low working efficiency and waste of time and labor.

In view of the defects of the existing equipment for machining NdFeB products as described above, in the prior art, a disc transition delivery mechanism is used, where a dual-disc transferring mechanism conveys two blank discs; the first blank disc is pushed into a position corresponding to an all-electric press for material loading, and returns to an original position after the material loading is completed; and the other blank disc is pushed into a position corresponding to the all-electric press for material loading and returns to the original position after the material loading is completed. Even with improved working efficiency, this type of structure has complex operation that still affects the working efficiency, because the two blank discs used must be moved and loaded with materials alternately and then return to their originals positions together, and the two blank discs must be loaded with products one after another; if one blank disc is not loaded with materials, it is impossible to proceed with next operation; and the two blank discs need to undergo multiple moving, return or other operations.

BRIEF SUMMARY OF THE INVENTION

An object of the present invention is to provide an electric press with disc stacking, in which two sets of cassette feeding mechanisms are provided for a cassette conveying mechanism to place blank discs, convey products, grab and place the blank discs and conduct palletization and output in coordination with a product disc stacking mechanism step by step, respectively, and the two sets of cassette feeding mechanisms do not affect each other during material loading and conveying and do not need to move and return multiple times, such that the operation is simple and the machining efficiency can be effectively improved.

The above technical object of the present invention is achieved by the following technical solution: an electric press with disc stacking, including two sets of all-electric presses, a blank disc transporting and stacking all-in-one machine disposed between the two sets of all-electric presses, and a control box, wherein the two sets of all-electric presses can be sealed independently and are capable of weighing neodymium iron boron powder and also compressing the weighed powder, the blank disc transporting and stacking all-in-one machine is capable of transporting blank discs, clamping workpieces and stacking the blank discs, and the control box controls the two sets of all-electric presses and the blank disc transporting and stacking all-in-one machine, wherein the blank disc transporting and stacking all-in-one machine includes side edges disposed on the all-electric presses, and a blank disc feeding mechanism capable of placing the blank discs for piling up the blank discs; a cassette conveying mechanism is disposed between the all-electric presses and the blank disc feeding mechanism; a product transporting and flipping mechanism is disposed on a side surface of the cassette conveying mechanism; a rear end of the cassette conveying mechanism is provided with a product disc stacking mechanism capable of stacking discs of finished products; a pallet feeding mechanism is disposed below the cassette conveying mechanism; and during loading and disc stacking, the blank disc feeding mechanism pushes the blank discs to a blank disc receiving station of the cassette conveying mechanism, which conveys the blank discs to a product loading station and installs products conveyed by the product transporting and flipping mechanism in the blank discs, meanwhile, the pallet feeding mechanism feeds pallets to the product disc stacking mechanism, the cassette conveying mechanism then conveys the loaded blank discs to a disc stacking station of the product disc stacking mechanism for a disc stacking operation and after the disc stacking, conveys the products into the pallets for palletizing, and finally, the product disc stacking mechanism conveys the palletized products to an unloading door at a tail end to unload the products by a transit wagon.

Preferably, the cassette conveying mechanism includes a conveying rack, an upper end of which is provided with two sets of movement guide rail; each set of the movement guide rail is provided with a matching graphite cassette fixing seat and a fore-and-aft movement cylinder for pushing the graphite cassette fixing seat to move; a rear end of each graphite cassette fixing seat is provided with a graphite cassette pushing cylinder, a tail end of the conveying rack corresponding to the movement guide rails is provided with a cassette positioning mechanism, and a rear end of the conveying rack is provided with a cassette lifting and partitioning mechanism.

Further preferably, the cassette positioning mechanism includes a cassette positioning cylinder disposed on a rear end of the conveying rack; a multi-joint robotic arm is disposed above the cassette positioning cylinder; and an output ed of the multi-joint robotic arm is connected to a robotic arm quick-change chuck for grabbing and flipping the products on the product transporting and flipping mechanism and then grabbing and installing the products in graphite cassettes.

Further preferably, the product transporting and flipping mechanism includes a product transporting frame that is provided with a product transporting cylinder; an output end of the product transporting cylinder is connected to a product transporting tray; the product transporting frame is connected to a flipping cylinder by means of a drag chain; and an output end of the flipping cylinder is connected to a flipping plate.

Further preferably, the cassette lifting and partitioning mechanism includes a lifting and feeding port provided at a rear end of the conveying rack; a cassette lifting guide rail and a cassette lifting cylinder are disposed below the lifting and feeding port and are connected to a side surface of the conveying rack; and the cassette lifting guide rail is provided with a cassette lifting and partitioning seat connected to the cassette lifting cylinder.

Further preferably, the product disc stacking mechanism includes a lifting conveying line mechanism; an output end of the lifting conveying line mechanism is connected to a conveying line framework, in which a conveying line is disposed; horizontal linear modules of a graphite cassette grabbing mechanism are disposed above the lifting conveying line mechanism; lower ends of the horizontal linear modules of the graphite cassette grabbing mechanism are provided with a matching longitudinal linear module of the graphite cassette grabbing mechanism; a lower end of the longitudinal linear module of the graphite cassette grabbing mechanism is connected, by means of a graphite cassette grabbing and lifting cylinder, to a dual-purpose clamping mechanism for cassette picking and capping; the output end of the lifting conveying line framework is connected provided with an unloading door, an inner side of which is correspondingly provided with an unloading-door opening/closing and compressing mechanism.

Further preferably, the lifting conveying line mechanism includes a base, the middle of which is provided with a lifting motor; an output end of the lifting motor is connected to a master transmission seat, both ends of which are each connected to a slave transmission seat; both ends of the slave transmission seat are each connected to a horizontal transmission rod, an output end of which is meshed and connected with a vertical screw rod; and the conveying line is connected to middle portions of the vertical screw rods.

Further preferably, the pallet feeding mechanism includes a pallet feeding box disposed on a middle portion of the conveying rack; a plurality of feeding rollers are disposed in the pallet feeding box, an input end of which is provided with a feeding door; and an output end of the pallet feeding box is provided with a flipping plate type separation door.

In summary, the present invention has the following beneficial effects. The blank disc transporting mechanism pushes the blank discs to a blank disk receiving station of the cassette conveying mechanism, which conveys the blank discs to the product loading station from the blank disc receiving station, and installs products conveyed by the product transporting and flipping mechanism in the blank discs; meanwhile, the pallet feeding mechanism feeds the pallets to the product disc stacking mechanism; then, the cassette conveying mechanism conveys the blank discs with materials loaded to the disc stacking station of the product disc stacking mechanism for disc stacking operation, and after the disc stacking operation, conveys the products into the pallets for palletizing; and finally, the product disc stacking mechanism conveys the palletized products to the unloading door at a tail end for unloading via a transit wagon. Two sets of cassette feeding mechanisms place blank discs, convey products, grab and place the blank discs, and conduct palletization and output in coordination with the product disc stacking mechanism, step by step, respectively. The two sets of cassette feeding mechanisms do not affect each other during material loading and conveying, and do not need to move and return multiple times. Therefore, the operation is simple, and the machining efficiency can be effectively improved.

Figure 1:
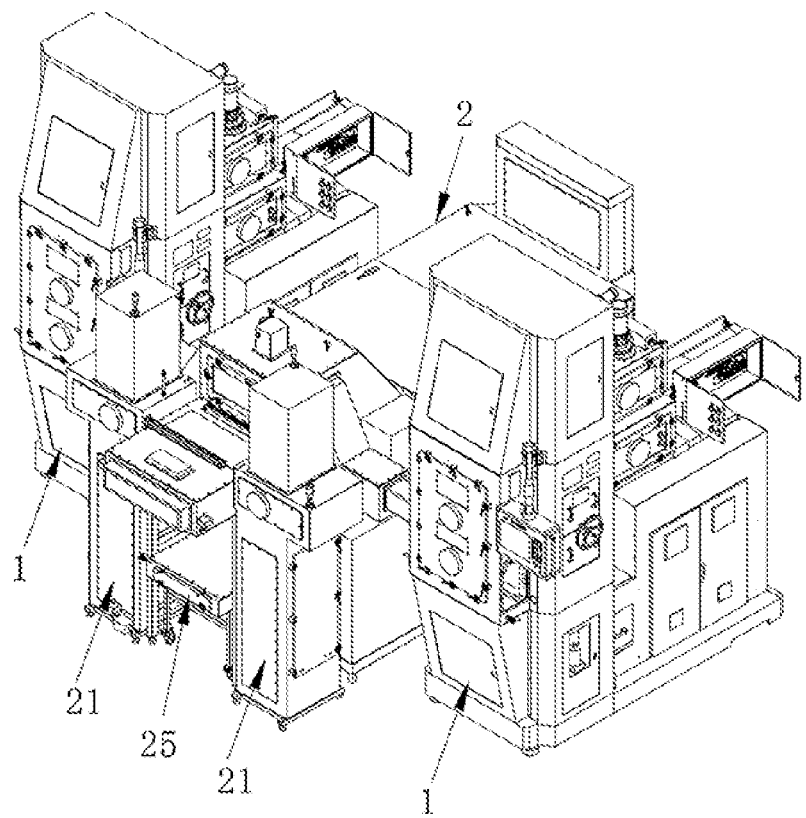
FIG. 1 shows a schematic structural diagram of the present invention.
Figure 2:
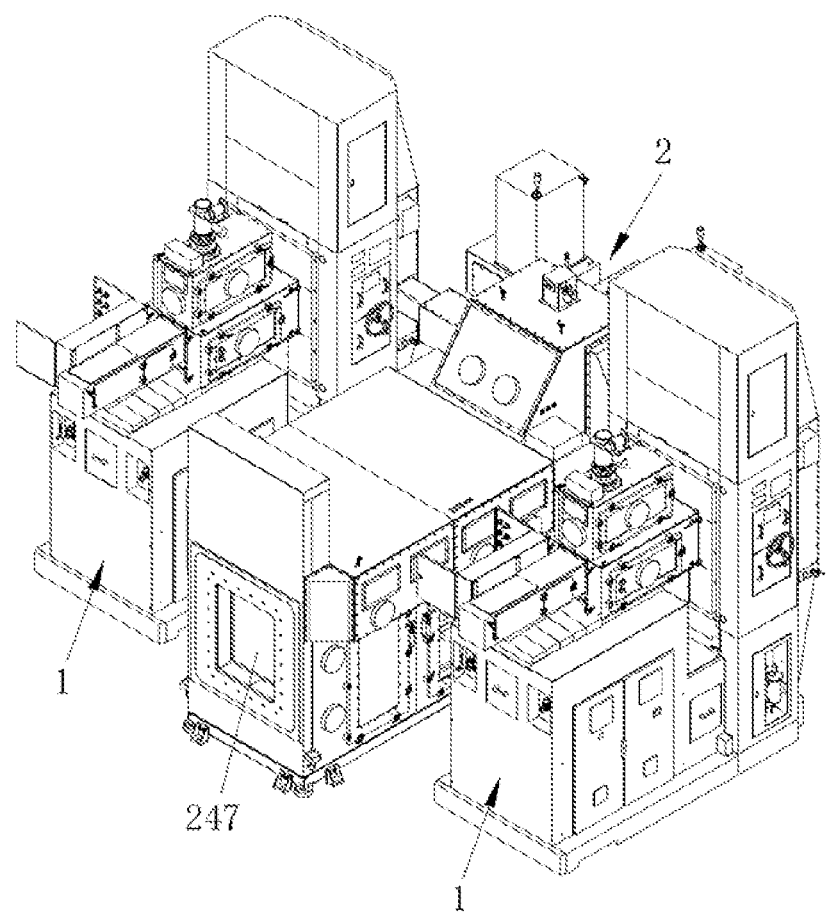
FIG. 2 shows a schematic structural diagram of the present invention from another point of view.
Figure 3:
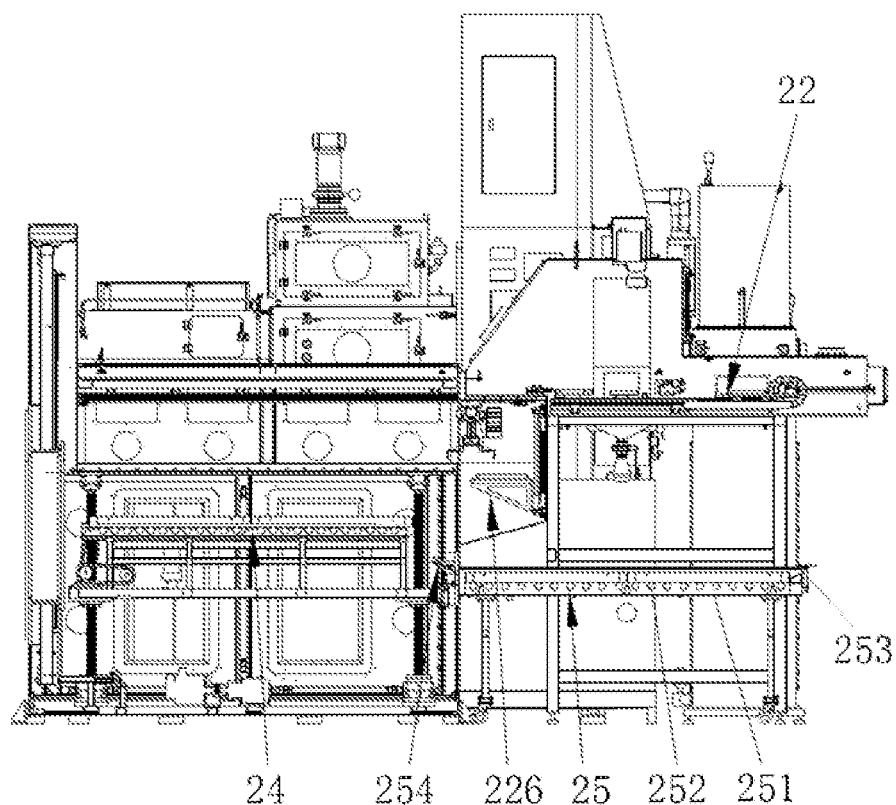
FIG. 3 shows a sectional view of the present invention.

In the drawings, reference signs are as follows: 1, all-electric press; 2, blank disc transporting and stacking all-in-one machine; 21, blank disc feeding mechanism; 22, cassette conveying mechanism; 23, product transporting and flipping mechanism; 24, product disc stacking mechanism; 25, pallet feeding mechanism; 221, conveying rack; 222, graphite cassette fixing seat; 223, fore-and-aft movement cylinder; 224, graphite cassette pushing cylinder; 225, cassette positioning mechanism; 226, cassette lifting and partitioning mechanism; 2251, cassette positioning cylinder; 2252, multi-joint robotic arm; 2253, robotic arm quick-change chuck; 2261, lifting and feeding port; 2262, cassette lifting guide rail; 2263, cassette lifting cylinder; 2264, cassette lifting and partitioning isolation seat; 231, product transporting cylinder; 232, flipping cylinder; 233, flipping plate; 241, lifting conveying line mechanism; 242, conveying line framework; 243, conveying line; 244, horizontal linear module of graphite cassette grabbing mechanism; 245, longitudinal linear module of graphite cassette grabbing mechanism; 246, dual-purpose clamping mechanism for cassette picking and capping; 247, unloading door; 248, unloading-door opening/closing and compressing mechanism; 249, graphite cassette grabbing and lifting cylinder; 2411, lifting motor; 2412, vertical screw rod; 251, pallet feeding box; 252, feeding roller; 253, loading door; and 254, flipping plate type separation door.

DETAILED DESCRIPTION

The present invention will be further explained below in conjunction with the accompanying drawings.

As shown in FIG. 1 to FIG. 8, an electric press with disc stacking includes two sets of all-electric presses 1 (which pertains to the prior art and will not be described here in detail any more), a blank disc transporting and stacking all-in-one machine 2 disposed between the two sets of all-electric presses 1, and a control box, wherein the two sets of all-electric presses 1 can be sealed independently and are capable of weighing neodymium iron boron powder and also compressing the weighed powder, the blank disc transporting and stacking all-in-one machine 2 is capable of transporting blank discs, clamping workpieces and stacking the blank discs, and the control box controls the two sets of all-electric presses 1 and the blank disc transporting and stacking all-in-one machine 2. The blank disc transporting and stacking all-in-one machine 2 includes side edges disposed on the all-electric presses 1, and a blank disc feeding mechanism 2 capable of placing the blank discs for piling up the blank discs; a cassette conveying mechanism 22 is disposed between the all-electric presses 1 and the blank disc feeding mechanism 21; a product transporting and flipping mechanism 23 is disposed on a side surface of the cassette conveying mechanism 22; a rear end of the cassette conveying mechanism 22 is provided with a product disc stacking mechanism 24 capable of stacking discs of finished products; a pallet feeding mechanism 25 is disposed below the cassette conveying mechanism 22. During loading and disc stacking, the blank disc feeding mechanism 21 pushes the blank discs to a blank disc receiving station of the cassette conveying mechanism 22, which conveys the blank discs to a product loading station and installs products conveyed by the product transporting and flipping mechanism 23 in the blank discs; meanwhile, the pallet feeding mechanism 25 feeds pallets to the product disc stacking mechanism 24, the cassette conveying mechanism 22 then conveys the loaded blank discs to a disc stacking station of the product disc stacking mechanism 24 for a disc stacking operation and after the disc stacking, conveys the products into the pallets for palletizing; and finally, the product disc stacking mechanism 24 conveys the palletized products to an unloading door 247 at a tail end to unload the products by a transit wagon. The two sets of cassette feeding mechanisms place blank discs, convey products, grab and place the blank discs, and conduct palletization and output in coordination with the product disc stacking mechanism, step by step, respectively; and the two sets of cassette feeding mechanisms do not affect each other during material loading and conveying, and do not need to move and return multiple times. Therefore, the operation is simple, and the machining efficiency can be effectively improved.

Figure 4:
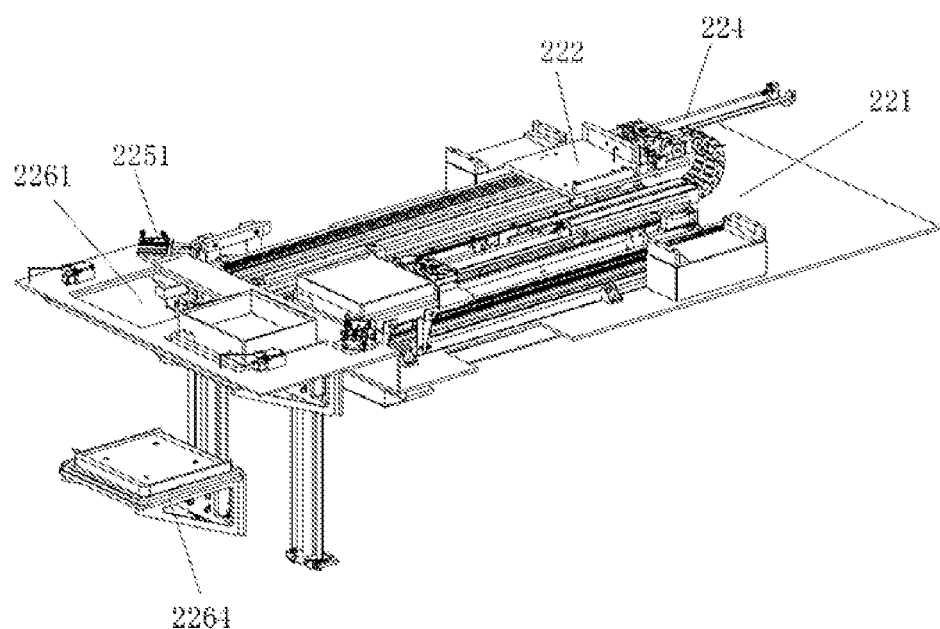
FIG. 4 shows a schematic structural diagram of a cassette conveying mechanism according to the present invention.
Figure 5:
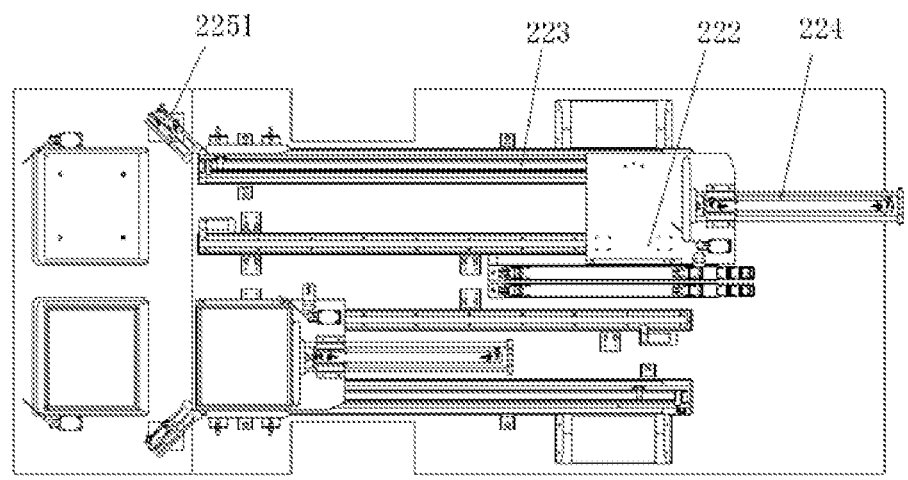
FIG. 5 shows a top view of a cassette conveying mechanism according to the present invention.
Figure 6:
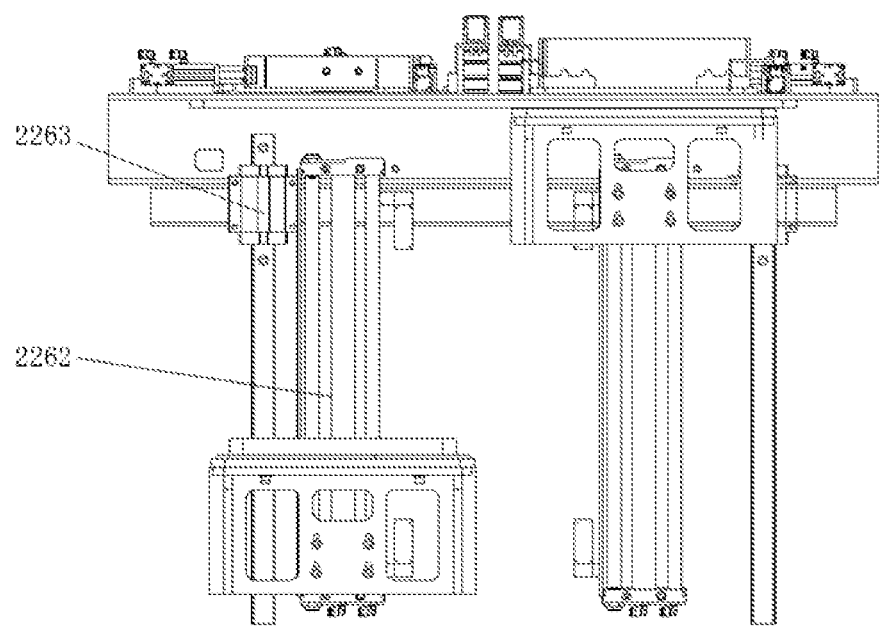
FIG. 6 shows a side view of a cassette conveying mechanism according to the present invention.

As shown in FIG. 4 to FIG. 6, in this embodiment, the cassette conveying mechanism 22 includes a conveying rack 221, an upper end of which is provided with two sets of movement guide rail; each set of the movement guide rail is provided with a matching graphite cassette fixing seat 222 and a fore-and-aft movement cylinder 223 for pushing the graphite cassette fixing seat to move; a rear end of each graphite cassette fixing seat 222 is provided with a graphite cassette pushing cylinder 224, a tail end of the conveying rack 221 corresponding to the movement guide rails is provided with a cassette positioning mechanism 225, and a rear end of the conveying rack 221 is provided with a cassette lifting and partitioning mechanism 226. After the blank disc transporting mechanism 21 transports blank graphite cassettes to the graphite cassette fixing seat 222, the blank graphite cassettes are pushed to the product loading station by the fore-and-aft movement cylinder 223 and positioned by the cassette positioning mechanism 225, which grabs products conveyed by the product transporting and flipping mechanism 23 into the graphite cassettes; the graphite cassette pushing cylinder 224 pushes the graphite cassettes with products loaded to the cassette lifting and partitioning mechanism 226, which coordinates with the product disc stacking mechanism 24 to palletizing the products.

As shown in FIG. 4 to FIG. 6, in this embodiment, the cassette positioning mechanism 225 includes a cassette positioning cylinder 2251 disposed on a rear end of the conveying rack 221; a multi-joint robotic arm 2252 is disposed above the cassette positioning cylinder 2251; and an output ed of the multi-joint robotic arm 2252 is connected to a robotic arm quick-change chuck 2253 for grabbing and flipping the products on the product transporting and flipping mechanism 23 and then grabbing and installing the products in graphite cassettes. The graphite cassettes are fixed by the cassette positioning cylinder 2251. The product transporting and flipping mechanism 23 includes a product transporting frame, which is provided with a product transporting cylinder 231. An output end of the product transporting cylinder 231 is connected to a product transporting tray. The product transporting frame is connected to a flipping cylinder 232 by means of a drag chain. An output end of the flipping cylinder 232 is connected to a flipping plate 233. The product transporting cylinder 231 pushes the products to the tail end of the product transporting frame; the multi-joint robotic arm 2252 then controls the robotic arm quick-change chuck 2253 to tightly grab the products and deliver the products to the turnover plate 233; the flipping cylinder 232 drives the flipping plate and the products for flipping; again, the multi-joint robotic arm 2252 controls the robotic arm quick-change chuck 2253 to grab the flipped products and deliver the products into the graphite cassettes for loading; and after the loading of products is completed, the graphite cassettes are delivered onto the cassette lifting and partitioning mechanism 226 by means of the graphite cassette pushing cylinder 224.

As shown in FIG. 4 to FIG. 6, in this embodiment, the cassette lifting and partitioning mechanism 226 includes a lifting and feeding port 2261 provided at a rear end of the conveying rack 221; a cassette lifting guide rail 2262 and a cassette lifting cylinder 2263 are disposed below the lifting and feeding port 2261 and are connected to a side surface of the conveying rack 221; and the cassette lifting guide rail 2262 is provided with a cassette lifting and partitioning seat 2264 connected to the cassette lifting cylinder 2263. The cassette lifting cylinder 2263 drives the cassette lifting and partitioning seat 2264 to ascend into a position of the lifting and feeding port 2261 along the cassette lifting guide rail 2262. After the loading of products is completed, the products are pushed to the lifting and feeding port 2261 on the cassette lifting and partitioning mechanism 226 by the graphite cassette pushing cylinder 224, and placed on the cassette lifting and partitioning seat 2264; and again, the cassette lifting cylinder 2263 drives the cassettes lifting and partitioning seat 2264 and the products to descend to a position corresponding to the product disc stacking mechanism 24. In addition, only in case of transporting, the cassette lifting and partitioning seat 2264 is moved to descend and the lifting and feeding port 2261 is separated and opened, and for the rest of the time, the cassette lifting and partitioning seat 2264 descends and the lifting and feeding port 2261 is closed, such that oxygen intrusion can be prevented to avoid product oxidation. In addition, an oxygen bearing device and a nitrogen supply device are provided to provide protection against oxygen. The oxygen bearing device is configured to detect oxygen content, and when the oxygen content exceeds a standard value, the oxygen is exhausted and nitrogen is supplied. The detection, output, input and the like of oxygen and nitrogen pertain to the prior art, which will not be described in details here.

Figure 7:
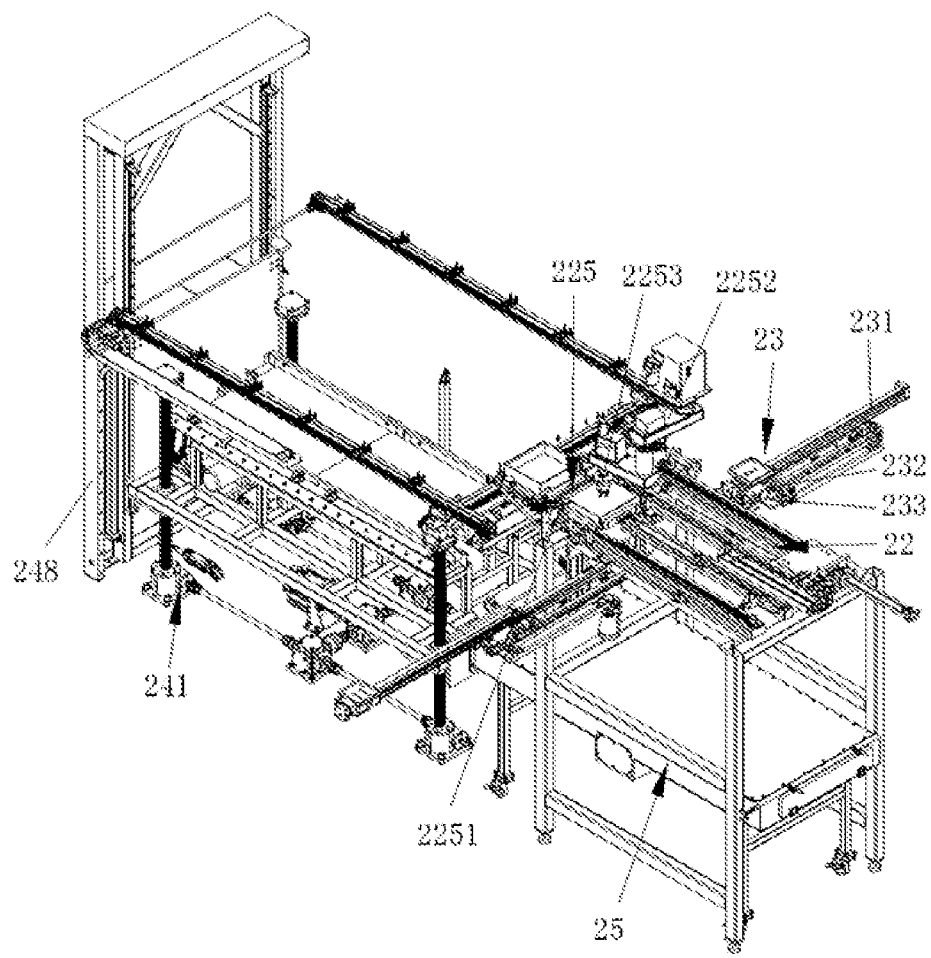
FIG. 7 shows a schematic structural diagram of a product disc stacking mechanism according to the present invention.

As shown in FIG. 7, in this embodiment, the product disc stacking mechanism 24 includes a lifting conveying line mechanism 241; an output end of the lifting conveying line mechanism 241 is connected to a conveying line framework 242, in which a conveying line 243 is disposed; horizontal linear modules 244 of a graphite cassette grabbing mechanism are disposed above the lifting conveying line mechanism 241; lower ends of the horizontal linear modules 244 of the graphite cassette grabbing mechanism are provided with a matching longitudinal linear module 245 of the graphite cassette grabbing mechanism; a lower end of the longitudinal linear module 245 of the graphite cassette grabbing mechanism is connected, by means of a graphite cassette grabbing and lifting cylinder 113, to a dual-purpose clamping mechanism 246 for cassette picking and capping; the output end of the lifting conveying line framework 241 is connected provided with an unloading door 247, an inner side of which is correspondingly provided with an unloading-door opening/closing and compressing mechanism 248, which closes the unloading door when not outputting the palletized products, in order to avoid product oxidation caused by oxygen intrusion.

Figure 8:
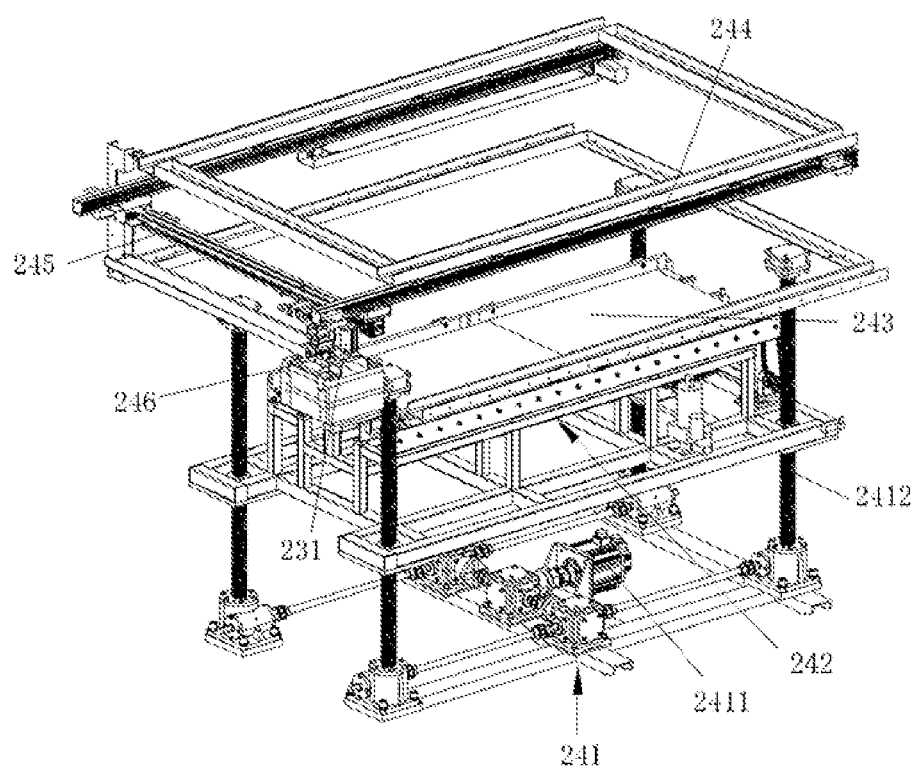
FIG. 8 shows a schematic structural diagram of a lifting conveying line mechanism according to the present invention.

As shown in FIG. 8, in this embodiment, the lifting conveying line mechanism 241 includes a base, the middle portion of which is provided with a lifting motor 2411; an output end of the lifting motor 2411 is connected to a master transmission seat, both ends of which are each connected to a slave transmission seat; both ends of the slave transmission seat are each connected to a horizontal transmission rod, an output end of which is meshed and connected with a vertical screw rod 2412; and the conveying line 243 is connected to middle portions of the vertical screw rods 2412. The lifting motor 2411 rotates forwardly and reversely to drive the master transmission seat to simultaneously actuate the rotation of the two slave transmission seats for rotating the four vertical screw rods 2412, thereby controlling the conveying line framework 242 and the conveying line 243 to conduct lifting movement. After movement to a position corresponding to the cassette lifting and partitioning seat 2264, the horizontal linear modules 244 of the graphite cassette grabbing mechanism, the longitudinal linear module 245 of the graphite cassette grabbing mechanism, and the graphite cassette grabbing and lifting cylinder 249 are coordinated in linkage, such that the dual-purpose clamping mechanism 246 for cassette picking and capping clamp the graphite cassettes with products loaded and deliver them to the pallets on the conveying line 243. After a layer of graphite cassettes with products loaded is placed on the pallets, the horizontal linear modules 244 of the graphite cassette grabbing mechanism, the longitudinal linear module 245 of the graphite cassette grabbing mechanism, and the graphite cassette grabbing and lifting cylinder 249 are coordinated to move down the dual-purpose clamping mechanism 246 for cassette picking and capping by a distance of one layer of the graphite cassettes with the products loaded, to subsequently carry out stacking for the next layer. In such a way, multi-layer disc stacking is implemented. Finally, by means of the conveying line 243, the products subjected to disc stacking are delivered out by a transit wagon via the unloading door 247.

In this embodiment, the pallet feeding mechanism 25 includes a pallet feeding box 251 disposed on a middle portion of the conveying rack 221; a plurality of feeding rollers 252 are disposed in the pallet feeding box 251, an input end of which is provided with a feeding door 253; and an output end of the pallet feeding box 251 is provided with a flipping plate type separation door 254. When the graphite cassettes are conveyed and loaded with products by means of the cassette conveying mechanism 22, the feeding door 253 is opened to allow conveying of the pallets onto the plurality of feeding rollers 252 for transportation; meanwhile, the lifting conveying line mechanism 241 drives the conveying line framework 242 and the conveying line 243 to move a position corresponding to the tail end of the pallet feeding box 251; and the flip plate type separation door 254 is opened to allow conveying of the pallets onto the conveying line 243.

The working principle of the present invention is as follows. After the blank disc transporting mechanism 21 transports blank graphite cassettes to the graphite cassette fixing seat 222, the blank graphite cassettes are pushed to the product loading station by the fore-and-aft movement cylinder 223. The product transporting cylinder 231 pushes the products to the tail end of the product transporting frame; the multi-joint robotic arm 2252 then controls the robotic arm quick-change chuck 2253 to tightly grab the products and deliver the products to the turnover plate 233; the flipping cylinder 232 drives the flipping plate and the products for flipping; and again, the multi-joint robotic arm 2252 controls the robotic arm quick-change chuck 2253 to grab the flipped products and deliver the products into the graphite cassettes for loading. After the loading of products is completed, the products are pushed to the lifting and feeding port 2261 on the cassette lifting and partitioning mechanism 226 by the graphite cassette pushing cylinder 224, and placed on the cassette lifting and partitioning seat 2264; and again, the cassette lifting cylinder 2263 drives the cassettes lifting and partitioning seat 2264 and the products to descend to a position corresponding to the product disc stacking mechanism 24. When the graphite cassettes are conveyed and loaded with products by means of the cassette conveying mechanism 22, the feeding door 253 is opened to allow conveying of the pallets onto the plurality of feeding rollers 252 for transportation; meanwhile, the lifting conveying line mechanism 241 drives the conveying line framework 242 and the conveying line 243 to move a position corresponding to the tail end of the pallet feeding box 251; and the flip plate type separation door 254 is opened to allow conveying of the pallets onto the conveying line 243. The lifting motor 2411 rotates forwardly and reversely to drive the master transmission seat to simultaneously actuate the rotation of the two slave transmission seats for rotating the four vertical screw rods 2412, thereby controlling the conveying line framework 242 and the conveying line 243 to conduct lifting movement. After movement to a position corresponding to the cassette lifting and partitioning seat 2264, the horizontal linear modules 244 of the graphite cassette grabbing mechanism, the longitudinal linear module 245 of the graphite cassette grabbing mechanism, and the graphite cassette grabbing and lifting cylinder 249 are coordinated in linkage, such that the dual-purpose clamping mechanism 246 for cassette picking and capping clamp the graphite cassettes with products loaded and deliver them to the pallets on the conveying line 243. After a layer of graphite cassettes with products loaded is placed on the pallets, the horizontal linear modules 244 of the graphite cassette grabbing mechanism, the longitudinal linear module 245 of the graphite cassette grabbing mechanism, and the graphite cassette grabbing and lifting cylinder 249 are coordinated to move down the dual-purpose clamping mechanism 246 for cassette picking and capping by a distance of one layer of the graphite cassettes with the products loaded, to subsequently carry out stacking for the next layer. In such a way, multi-layer disc stacking is implemented. Finally, by means of the conveying line 243, the products subjected to disc stacking are delivered out by a transit wagon via the unloading door 247.

Described above only provides preferred embodiments of the present invention. Therefore, any equivalent variations or modifications made to the construction, features and principle within the scope of patent application of the present invention shall be included within the scope of patent application of the present invention.

The invention claimed is:

1. An electric press with disc stacking, comprising two sets of all-electric presses (1), a blank disc transporting and stacking all-in-one machine (2) disposed between the two sets of all-electric presses (1), and a control box, wherein the two sets of all-electric presses (1) can be sealed independently and are capable of weighing neodymium iron boron powder and compressing the neodymium iron boron powder, wherein the blank disc transporting and stacking all-in-one machine (2) is capable of transporting blank discs, clamping workpieces and stacking the blank discs, wherein the control box controls the two sets of all-electric presses (1) and the blank disc transporting and stacking all-in-one machine (2), wherein the blank disc transporting and stacking all-in-one machine (2) further comprises side edges disposed on the all-electric presses (1), and a blank disc feeding mechanism (2) capable of placing the blank discs for piling up the blank discs; wherein a cassette conveying mechanism (22) is disposed between the all-electric presses (1) and the blank disc feeding mechanism (21); wherein a product transporting and flipping mechanism (23) is disposed on a side surface of the cassette conveying mechanism (22); wherein a rear end of the cassette conveying mechanism (22) is provided with a product disc stacking mechanism (24) capable of stacking discs of finished products; wherein a pallet feeding mechanism (25) is disposed below the cassette conveying mechanism (22); wherein during loading and disc stacking, the blank disc feeding mechanism (21) pushes the blank discs to a blank disc receiving station of the cassette conveying mechanism (22), which conveys the blank discs to a product loading station and installs products conveyed by the product transporting and flipping mechanism (23) in the blank discs, meanwhile, wherein the pallet feeding mechanism (25) feeds pallets to the product disc stacking mechanism (24), the cassette conveying mechanism (22) then conveys the loaded blank discs to a disc stacking station of the product disc stacking mechanism (24) for a disc stacking operation and after the disc stacking, conveys the products into the pallets for palletizing, and finally, the product disc stacking mechanism (24) conveys the palletized products to an unloading door (247) at a tail end to unload the products by a transit wagon;

Wherein the cassette conveying mechanism (22) further comprises a conveying rack (221), an upper end of which is provided with two sets of movement guide rail; wherein each set of the movement guide rail is provided with a matching graphite cassette fixing seat (222) and a fore-and-aft movement cylinder (223) for pushing the graphite cassette fixing seat to move; wherein a rear end of each graphite cassette fixing seat (222) is provided with a graphite cassette pushing cylinder (224), wherein a tail end of the conveying rack (221) corresponding to the movement guide rails is provided with a cassette positioning mechanism (225), and wherein a rear end of the conveying rack (221) is provided with a cassette lifting and partitioning mechanism (226); and Wherein the pallet feeding mechanism (25) further comprises a pallet feeding box (251) disposed on a middle part of the conveying rack (221), and is internally provided with a plurality of feeding rollers (252), wherein an input end of the pallet feeding box (251) is provided with a feeding gate (253), and wherein an output end of the pallet feeding box (251) is provided with a flipping plate type separation door (254).

2. The electric press with disc stacking according to claim 1, wherein the cassette positioning mechanism (225) further comprises a cassette positioning cylinder (2251) disposed on a rear end of the conveying rack (221); wherein a multi-joint robotic arm (2252) is disposed above the cassette positioning cylinder (2251); and wherein an output ed of the multi-joint robotic arm (2252) is connected to a robotic arm quick-change chuck (2253) for grabbing and flipping the products on the product transporting and flipping mechanism (23) and then grabbing and installing the products in graphite cassettes.

3. The electric press with disc stacking according to claim 1, wherein the product transporting and flipping mechanism (23) further comprises a product transporting frame that is provided with a product transporting cylinder (231); wherein an output end of the product transporting cylinder (231) is connected to a product transporting tray; wherein the product transporting frame is connected to a flipping cylinder (232) by means of a drag chain; and wherein an output end of the flipping cylinder (232) is connected to a flipping plate (233).

4. The electric press with disc stacking according to claim 1, wherein the cassette lifting and partitioning mechanism (226) further comprises a lifting and feeding port (2261) provided at a rear end of the conveying rack (221); wherein a cassette lifting guide rail (2262) and a cassette lifting cylinder (2263) are disposed below the lifting and feeding port (2261) and are connected to a side surface of the conveying rack (221); and wherein the cassette lifting guide rail (2262) is provided with a cassette lifting and partitioning seat (2264) connected to the cassette lifting cylinder (2263).

5. The electric press with disc stacking according to claim 1, wherein the product disc stacking mechanism (24) further comprises a lifting conveying line mechanism (241); wherein an output end of the lifting conveying line mechanism (241) is connected to a conveying line framework (242), in which a conveying line (243) is disposed; wherein horizontal linear modules (244) of a graphite cassette grabbing mechanism are disposed above the lifting conveying line mechanism (241); wherein lower ends of the horizontal linear modules (244) of the graphite cassette grabbing mechanism are provided with a matching longitudinal linear module (245) of the graphite cassette grabbing mechanism; wherein a lower end of the longitudinal linear module (245) of the graphite cassette grabbing mechanism is connected, by means of a graphite cassette grabbing and lifting cylinder (113), to a dual-purpose clamping mechanism (246) for cassette picking and capping; wherein the output end of the lifting conveying line framework (241) is connected provided with an unloading door (247), an inner side of which is correspondingly provided with an unloading-door opening/closing and compressing mechanism (248).

6. The electric press with disc stacking according to claim 5, wherein the lifting conveying line mechanism (241) further comprises a base, the middle of which is provided with a lifting motor (2411); wherein an output end of the lifting motor (2411) is connected to a master transmission seat, both ends of which are each connected to a slave transmission seat; wherein both ends of the slave transmission seat are each connected to a horizontal transmission rod, an output end of which is meshed and connected with a vertical screw rod (2412); and wherein the conveying line (243) is connected to middle portions of the vertical screw rods (2412).

* * * * *